Sheet 2-2 Sheets.

J. Shobe.
Corn Harvester.

Nº 63111      Patented Mar. 19, 1867.

Witnesses
John S. Poler
Samuel Harris

Inventor
James Shobe
by his Attorneys
J. B. Woodruff & Son

United States Patent Office.

JAMES SHOBE, OF PRINCIPIO, MARYLAND.

Letters Patent No. 63,111, dated March 19, 1867.

IMPROVEMENT IN CORN HARVESTERS.

*The Schedule referred to in these Letters Patent and making part of the same.*

TO ALL WHOM IT MAY CONCERN:

Be it known that I, JAMES SHOBE, of Principio, in the county of Cecil, in the State of Maryland, have invented certain new and useful Improvements in Corn and Cane Harvesters, and the following is a full, clear, and exact description of the same, reference being had to the accompanying drawings. making a part of this specification, in which—

Figure 1:
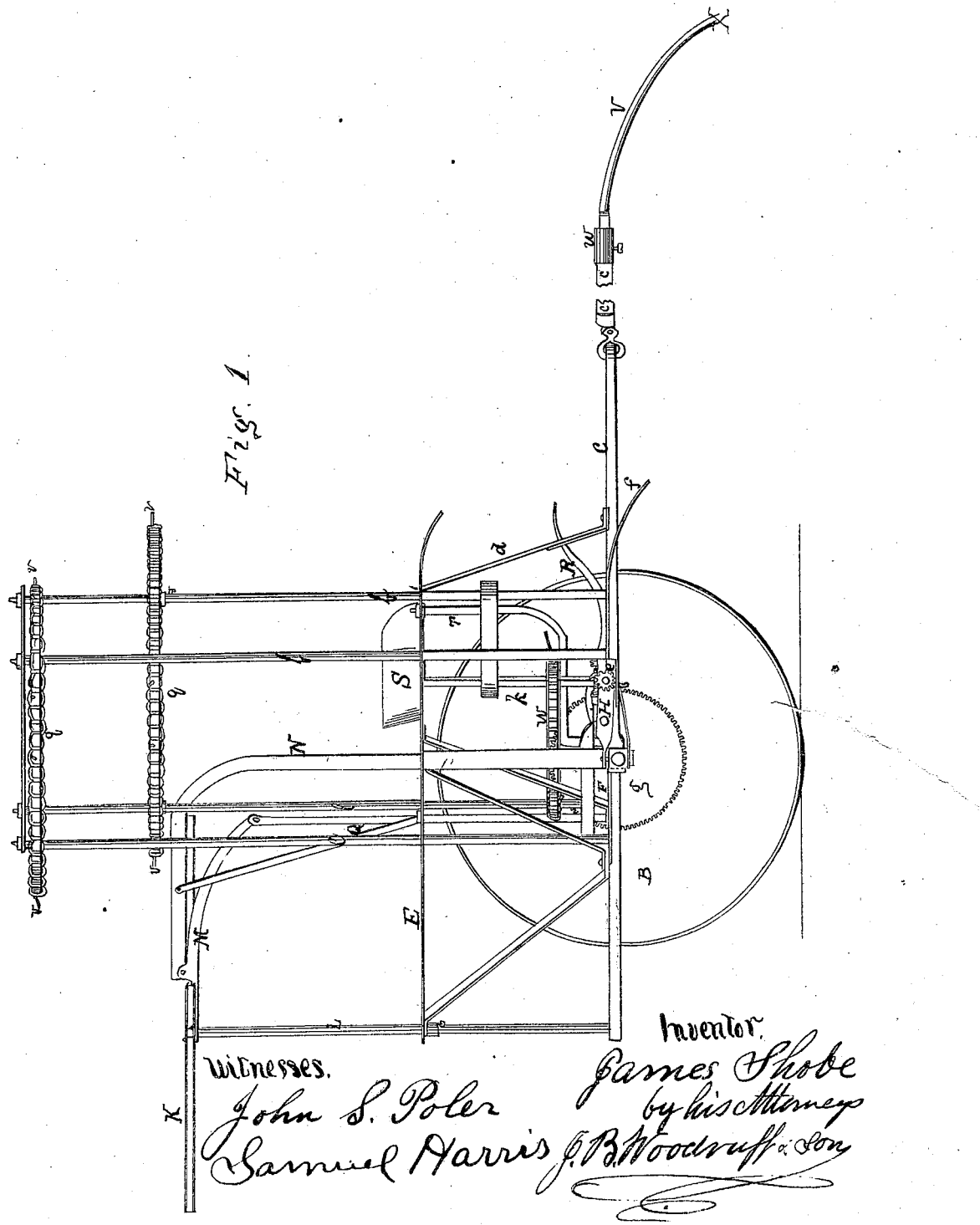
Figure 1 represents a section through a side elevation of the machine with the shafts broken off and the forward end parting iron.

The object of my invention is to supply the public with a good practical working automatic corn and cane cutter and gatherer, that will be durable, and easily operated by one horse, cutting two rows at the same time, thereby saving much time and hard labor in securing the crop.

My invention consists in the arrangement and combination of the receiving platform with the standards and cross-arms for holding the gavels, and also the spring-lever, forked catches, and foot apparatus for liberating them at the will of the driver.

To enable others skilled in the art to make and use my invention, I will describe it more fully, referring to the drawings, and to the letters of reference marked thereon.

Figure 2:
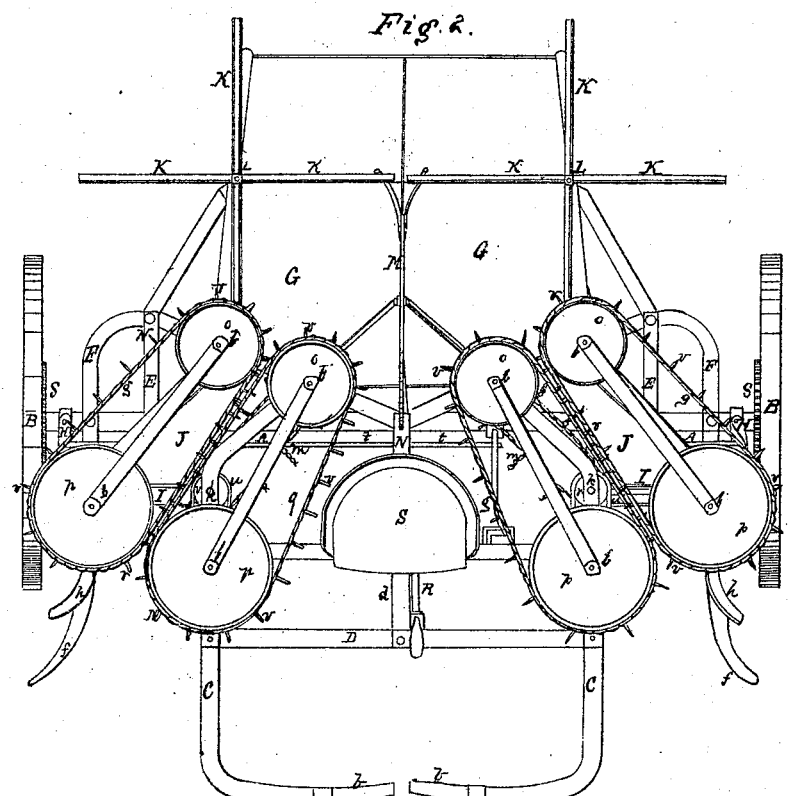
Figure 2 shows a plan or top view of the machine with the gathering, holding, and liberating mechanism.
Figure 3:
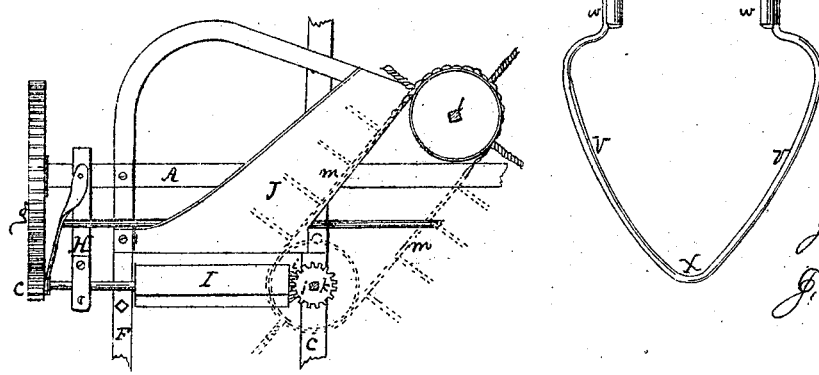
Figure 3 is an enlarged view of the cutting mechanism, the supporting guide table, and the endless chain gathering rake.

In constructing my improved corn and cane harvester, I use a square iron bar, of a sufficient size to support the weight of the machine, and the stalks or corn that can accumulate on the platform, for an axle, A A, the ends being fitted for the wheels B B to run on in the ordinary manner. To the axle-bar A A I fit and bolt the main pieces of the frame C C, they being made of bars of flat iron, the forward ends being bent or curved towards the centre, on which to attach the shafts $c\ c\ c\ c$, as seen in fig. 2. Between the bent ends $b\ b$ and the axle A A is secured a connecting-bar, D, on which the central portion of the elevated frame E E is supported. On both sides of the main frame C C are secured to it, and the axle A A, bent bars of iron, F F, the forward ends forming guides $f\ f$ to bring the swayed corn or cane up to the revolving cutters I I, which have their bearings in the frame C C and guide-bars F F; or, if desirable to have the bearings near the pinion $e\ e$, which revolves the cutters I I, a pair of stiff arms, H H, are attached to the axle near to the wheels B B, on the inside of which are spur gear-wheels $g\ g$, to operate the cutting and gathering mechanism. Above the lower guide-bars F F are similar iron guide-bars $h\ h$, which are supported at a suitable height on the standards $d\ d$, the elevated part of the frame E E and the guides $h\ h$ being placed in such relative position with each other as to leave a space or channel for the corn to be conveyed back on to the platforms G after it is cut, in a vertical position, the lower ends of the stalks resting and sliding along on the tables J J, they being in the plane with the top of the revolving cutters I I. On the inner ends of the cutter shafts are placed bevel gear-wheels $i\ i$, into which are geared similar wheels $j\ j$, on the bottom of the vertical shafts $k\ k$, to give motion to the gathering and conveying mechanism, which consists of the endless chain or wire-work raking belts $m\ m$, placed on the pulleys $n\ n$ near the bottom of the vertical shafts $k\ k$ and the tall shafts $b\ b$, there being four of the tall shafts $b\ b$, for each of the gathering and moving apparatus, on the top of which are band-wheels $o\ o$ and $p\ p$, made so that they can be slid up or down on the shafts $b\ b$, and secured in any desired position to accommodate the length of stalks or cane. On the top pulleys $o\ p$ are also placed endless chain-raking belts $q\ q$, with series of teeth $r\ r\ r\ r$ to take hold and convey the cut corn back and lodge it against the arms $k\ k$, which are placed so as to revolve on the top of the back standards L L. The arms K K are held from turning by a forked hook-lever M, which is hinged to a braced standard, N, supported on the centre of the axle A in the middle of the machine, the lever M being connected by a rod, Q, with a foot-lever, R, which extends forward under the driver's seat S. When a sufficient quantity of corn or cane has accumulated on the platform G, and lodged against the arms K, to form a gavel or bundle, the driver, in his seat, springs the foot-lever R, which trips the hooked-lever M, and allows the arms to turn one-fourth and drops the gavel. The revolving cutters I I, and the gathering apparatus are each one operated independent of the other by the spur gear-wheels $g\ g$ on the wheels B B, the pinions $e\ e$ on the cutter-shafts being made to slide in and out of gear by having connecting-rods $t\ t$ attached to a handlever, T, within reach of the driver, so that he can throw the working parts in and out of gear at pleasure. The gathering apparatus may be worked by the bolts $u\ u$, or, if desirable, positive motions may be given to all of the upright shafts by gear connections. For cutting cane, which is desirable to have cut as low down as possible, the wheels B B are removed and a much smaller pair are substituted for them; this gives a more rapid motion to the cutters, which is an advantage in hard substances, the motion of the cutters being forward directly against the stalks, revolving upward so that the butt is placed by it on to the guide table as soon as it is severed from the stump, leaving no obstruction to the progress of the machine in the rear of the cutters. If the corn or cane be fallen or swayed about so as to lay across the space between the rows so as to obstruct the passage for the horse in working the harvester, I have a spade-shaped bow or parting iron V V, with sockets $w\ w$ to slip on to the ends of the shafts before the horse's breast. The forward point $x$ being bent down so as to take under the inclined stalks, will raise them up and conduct them properly to the cutting apparatus; the guide irons $f\ f$ being also bent down to lift up the stalks that are inclined outward and conduct them to the cutters, thus preventing the dividing-wheels from running on to the corn; thus making a clear track for them. A good, simple, cheap, and practical working corn-harvesting machine has hitherto been regarded as the most difficult to produce of all the modern inventions for agricultural purposes. In the first place, corn-stalks and sugar-cane are hard substances to cut by the ordinarily constructed cutters for agricultural implements; they being stiff and heavy are liable to lean over or be swayed in all directions, making it extremely difficult to gather all of the stalks up and bring them properly to the action of the cutters, and after they have been severed some of them are liable to fall by their weight in front of the cutters so as to obstruct the cutting of the standing corn and clog up the machine.

I do not claim broadly the revolving cutters, as shown, for cutting cane or stalks; nor do I claim endless belts with teeth for gathering and conducting the cut corn into gavels; but what I do claim as my invention, and desire to secure by Letters Patent, is—

The combination of the revolving cutters I I, receiving-guides $f\ h$, gathering-belts $m\ q$, standards $k\ b$, and cross-arms K K, for holding the gavels, the forked hook-catch M and foot-lever R for liberating, as herein specified.

Subscribed to on this 26th day of June, 1866.

JAMES SHOBE.

Witnesses:
   EDM. F. BROWN,
   R. WAKEMAN.